United States Patent
Armstrong et al.

(10) Patent No.: US 9,891,818 B2
(45) Date of Patent: Feb. 13, 2018

(54) ADAPTIVE TOUCH-SENSITIVE DISPLAYS AND METHODS

(75) Inventors: Andrew Alan Armstrong, Winchester (GB); Jonathan Christopher Mace, Winchester (GB); Richard William Pilot, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1100 days.

(21) Appl. No.: 12/982,700

(22) Filed: Dec. 30, 2010

(65) Prior Publication Data
US 2012/0169613 A1 Jul. 5, 2012

(51) Int. Cl.
G06F 3/041 (2006.01)
G06F 3/0488 (2013.01)
G06F 3/023 (2006.01)

(52) U.S. Cl.
CPC ........ G06F 3/04886 (2013.01); G06F 3/0233 (2013.01)

(58) Field of Classification Search
CPC .. G06F 3/04886; G06F 3/0237; G06F 17/276; G06F 3/0238; G06F 3/0233; G06F 3/04895; G06F 3/0216; G06F 3/0416; G06F 3/0426; G06F 3/0488
USPC ........................................................ 345/173
See application file for complete search history.

(56) References Cited

U.S. PATENT DOCUMENTS

| | | | |
|---|---|---|---|
| 5,128,672 A | 7/1992 | Kaehler | |
| 5,748,512 A | 5/1998 | Vargas | |
| 2003/0074647 A1* | 4/2003 | Andrew | G06F 9/4443 717/100 |
| 2005/0206730 A1* | 9/2005 | Hagiwara | G06F 3/0426 348/169 |
| 2006/0053387 A1* | 3/2006 | Ording | G06F 3/04883 715/773 |
| 2007/0152980 A1* | 7/2007 | Kocienda | G06F 3/0236 345/173 |
| 2007/0174788 A1* | 7/2007 | Ording | G06F 3/04883 715/816 |
| 2007/0229476 A1* | 10/2007 | Huh | G06F 3/04886 345/173 |
| 2008/0066167 A1* | 3/2008 | Andri | G06F 21/46 726/5 |
| 2009/0150814 A1 | 6/2009 | Eyer et al. | |
| 2009/0199119 A1 | 8/2009 | Park et al. | |
| 2009/0265662 A1 | 10/2009 | Bamford | |

(Continued)

FOREIGN PATENT DOCUMENTS

CM 101384977 A 3/2009
CN 1432912 A 7/2003
(Continued)

Primary Examiner — Jose Soto Lopez
(74) Attorney, Agent, or Firm — Schmeiser, Olsen & Watts LLP

(57) ABSTRACT

Described are a system and method for modifying an element displayed on a touch-sensitive device. A user input associated with a first element is displayed on a touch-sensitive device. An input error is detected based on the user input. A rule is applied that determines an action to be directed to a second element on the touch-sensitive device in response to the user input error. The action is applied to the second element in response to the applied rule.

25 Claims, 7 Drawing Sheets

(56) References Cited

U.S. PATENT DOCUMENTS

| | | | |
|---|---|---|---|
| 2010/0053088 A1* | 3/2010 | Bae | G06F 3/04886 345/168 |
| 2010/0060666 A1* | 3/2010 | Fong | G06F 3/0482 345/661 |
| 2010/0079310 A1* | 4/2010 | Nachman | G06F 3/0233 341/23 |
| 2010/0115448 A1* | 5/2010 | Lysytskyy | G06F 3/04886 715/773 |
| 2010/0134432 A1* | 6/2010 | Seo | G06F 3/04817 345/173 |
| 2010/0259561 A1* | 10/2010 | Forutanpour | G06F 3/0216 345/660 |
| 2011/0018812 A1* | 1/2011 | Baird | G06F 3/04886 345/173 |
| 2011/0078613 A1* | 3/2011 | Bangalore | G06F 3/04886 715/773 |
| 2011/0090151 A1* | 4/2011 | Huang | G06F 3/0237 345/168 |
| 2011/0154246 A1* | 6/2011 | Oh | G06F 3/04886 715/773 |
| 2011/0157042 A1* | 6/2011 | Li | G06F 3/0488 345/173 |
| 2011/0181536 A1* | 7/2011 | Yoshihara | G06F 3/0233 345/173 |
| 2011/0201387 A1* | 8/2011 | Paek | G06F 3/0237 455/566 |
| 2011/0214053 A1* | 9/2011 | Scott | G06F 3/021 715/259 |
| 2011/0285651 A1* | 11/2011 | Temple | 345/173 |
| 2011/0310019 A1* | 12/2011 | Wilson | G06F 3/04886 345/168 |
| 2012/0166995 A1* | 6/2012 | McAleer | G06F 3/04886 715/773 |

FOREIGN PATENT DOCUMENTS

| | | |
|---|---|---|
| CN | 101390039 A | 3/2009 |
| WO | 2010117385 A1 | 10/2010 |

* cited by examiner

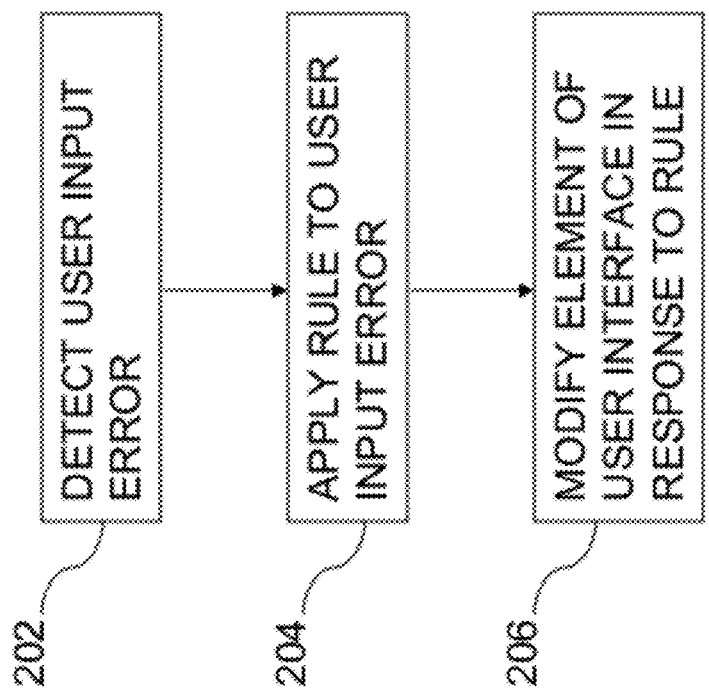

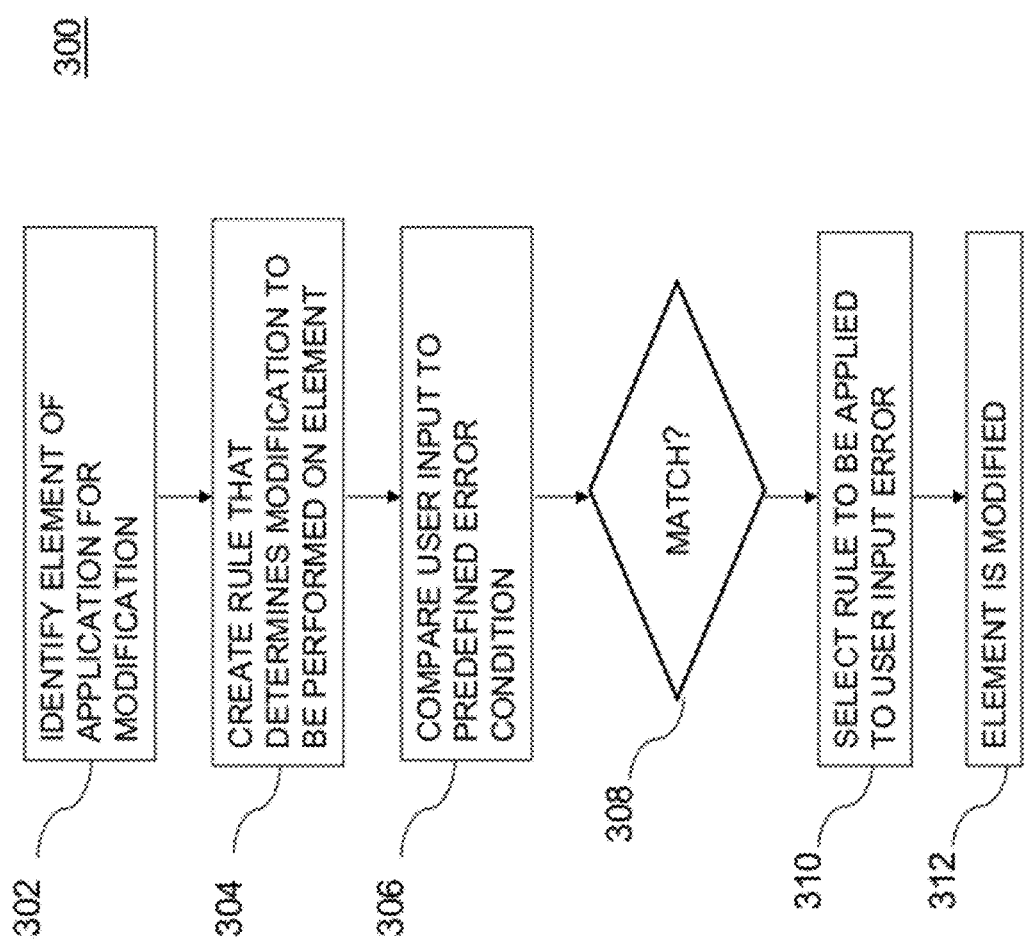

ADAPTIVE TOUCH-SENSITIVE DISPLAYS AND METHODS

FIELD OF THE INVENTION

The invention relates generally to the field of electronic visual displays, and in particular, to systems and methods for modifying a display area of a touchscreen in response to user inputs.

BACKGROUND

Modern electronic devices such as personal digital assistants (PDAs), mobile phones, tablet computers, and other related electronic devices generally include a visual display that includes a graphical user interface for displaying information. A well-known electronic visual display is a touchscreen, which not only displays information, but also serves as an input device.

A touchscreen can display a set of graphical user interface (GUI) elements, also referred to as GUI objects or GUI items, which are organized and displayed on the touchscreen, for example, as icons, menus, uniform resource locator (URL) fields, virtual keyboards, and the like. A touchscreen also permits users to enter data, commands, or other inputs to an application executing on the electronic device. This can be achieved by applying physical pressure with a finger or pointed object such as a stylus to a region of the touchscreen proximal to the relevant GUI element. Thus, a GUI element, for example, a key on a virtual keyboard, can serve as a virtual input device. A user can therefore produce email or text messages, enter a uniform resource locator (URL) into a web browser displayed on the touchscreen, or select menu items or icons displayed on the touchscreen.

As mobile device applications continue to advance, and as mobile devices continue to support new features and functions, application developers require a greater degree of flexibility with regard to developing screen layouts on a touchscreen that are intuitive for the user.

BRIEF SUMMARY

According to one embodiment, a computer-implemented method is provided for modifying an element displayed on a touch-sensitive device. A user input associated with a first element is displayed on a touch-sensitive device. An input error is detected based on the user input. A rule is applied that determines an action to be directed to a second element on the touch-sensitive device in response to the user input error. The action is applied to the second element in response to the applied rule.

According to another embodiment, a computer-implemented method is provided for modifying an element of an application displayed on a touch-sensitive device. A user input associated with a first element of an application is displayed on a touch-sensitive device. A user input error provided to the application is detected based on the user input. A rule is applied that determines an action to be directed to a second element of an application on the touch-sensitive device in response to the user input error. The action is applied to the second element of the application in response to the applied rule.

According to another embodiment, a system is provided for modifying a touch-sensitive interface element. An error detection module is configured to receive a user input associated with a first touch-sensitive interface element and to detect a user input error based on the user input. A rules engine module is configured to apply a rule that determines an action to be applied to the first touch-sensitive interface element in response to the user input error. A user interface adjustment module configured to apply the action to the second element in response to the applied rule.

According to another embodiment of the invention, a computer program product is provided for modifying an element displayed on a touch-sensitive device. The computer program product comprises a computer readable storage medium having computer readable program code embodied therewith. Computer readable program code is configured to receive a user input associated with a first element displayed on a touch-sensitive device. Computer readable program code is configured to detect a user input error based on the user input. Computer readable program code is configured to apply a rule that determines an action to be directed to a second element on the touch-sensitive device in response to the user input error. Computer readable program code is configured to apply the action to the second element in response to the applied rule.

BRIEF DESCRIPTION OF SEVERAL VIEWS OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 2 is a flowchart of an embodiment of a method for modifying elements displayed on a touch-sensitive device.

FIG. 3 is a flowchart of an embodiment of another method for modifying elements displayed on a touch-sensitive device.

DETAILED DESCRIPTION

Figure 1:
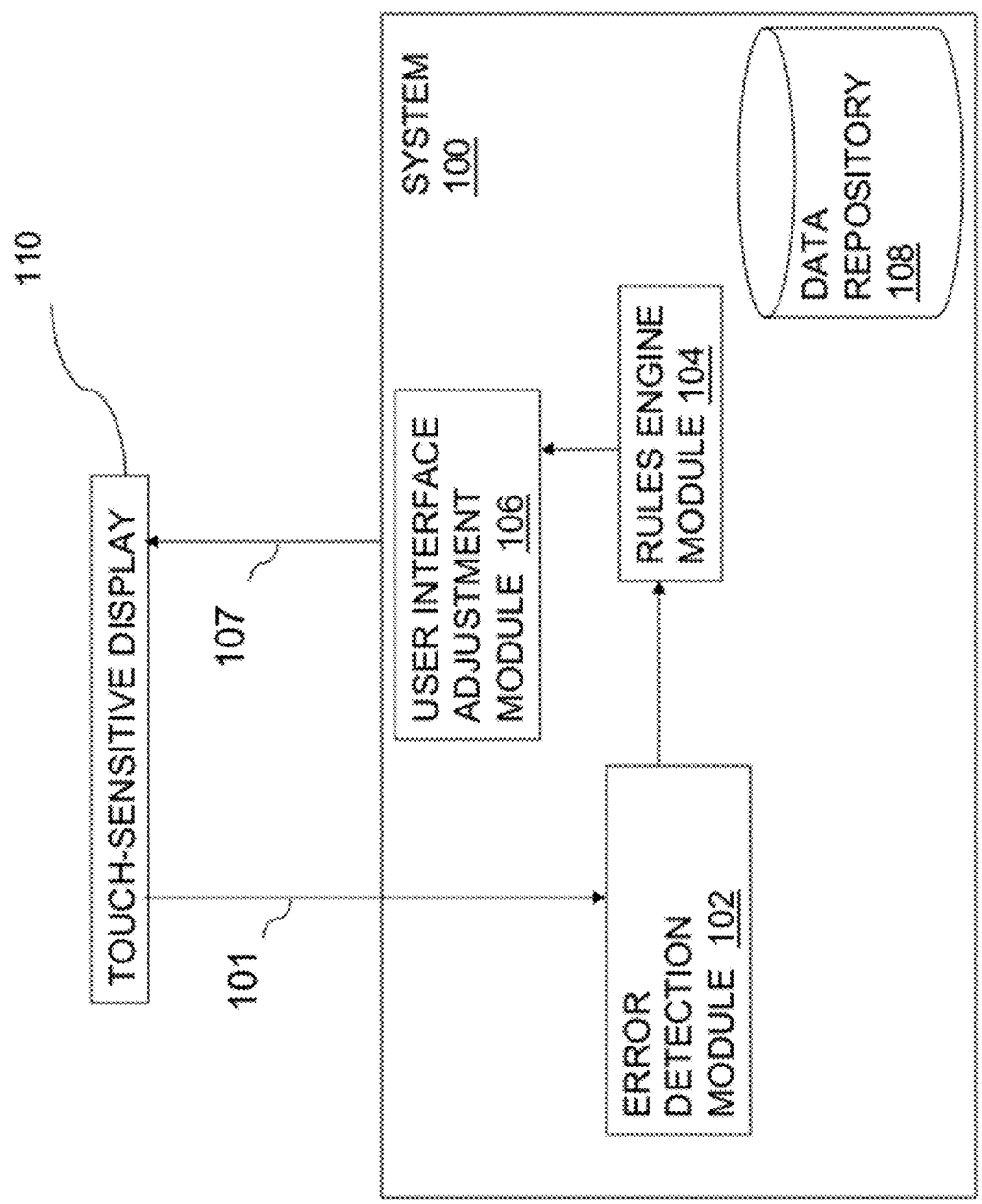
FIG. 1 is a block diagram of an embodiment of a system for modifying elements displayed on a touch-sensitive device.

In the following description, specific details are set forth although it should be appreciated by one of ordinary skill that the present invention can be practiced without at least some of the details. In some instances, known features or processes are not described in detail so as not to obscure the present invention.

In brief overview, the present invention features a system and method for detecting user input errors in real-time, which can occur during use of a touch-sensitive display device, for example, a touchscreen interface, and modifying the layout, sizing, and general appearance of display device to simplify the user's subsequent action to rectify the error.

The system and method determine if a user performs an action applied to a touchscreen interface, e.g., touching a region of the touchscreen interface to perform an action, and to determine whether the action constitutes a user input error. A user input error can be determined by comparing the user input in accordance with the action to a set of predefined error conditions. An error condition can define which user input or sequence of user inputs constitutes a user input error. A rule defines an appropriate action to take in response to the user input error. The user input error is compared to the rule to determine an intuitive modification to the touchscreen interface that assists the user in rectifying the error.

An application developer or other user can determine features of an application displayed on a touchscreen interface that may reduce input error rates when the systems and methods are employed. This can be achieved by specifying which elements of the application, for example, GUI elements, are used to determine when a user input error has occurred. For example, an element specified as an input error can be a virtual keyboard character immediately followed by a backspace. The application developer or other user can create one or more rules that establish at least one action to be performed on the touchscreen interface in response to a user input error defined according to the predefined conditions. Such actions can be established to enhance the intuitiveness of the application, or reduce complexity associated with use of the application. For example, a rule can be created to enlarge virtual keyboard letters surrounding a keyboard letter touched in error, when the keyboard letter touched in error was followed by touching a backspace key of the virtual keyboard.

In order to determine when user input errors occur, certain GUI elements such as icons, virtual keys, and the like, for example, the backspace key of a virtual keyboard, are displayed on the touchscreen interface, and are identified as being commonly used to rectify a user input error. The system and method can identify when a user has corrected an error, for example, using the backspace key to remove an erroneously entered character and replace it with the correct character. The system and method can store this information in a data repository. Relationships or associations between user input errors and a subsequent user input rectifying the user input error can therefore be determined, and learned, and relied on when actions are performed in response to subsequent user input errors. The system and method can automatically generate user interface layouts to minimize future user input errors from occurring. Collecting this learned information also allows the application to confirm whether actions previously taken in response to user input errors are indeed effective at reducing or preventing user input errors from occurring.

These foregoing features address a shortcoming in conventional touchscreen devices, namely, lack of tactile feedback when providing input via a touchscreen that render conventional touchscreens prone to input errors. The size and content of a touchscreen, for example, configured with a virtual keyboard, web browser, or other applications, can also increase input error rates.

Though described below primarily as a method, it will be appreciated by one skilled in the art that aspects of the present invention may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram of an embodiment of a system 100 for modifying elements displayed on a touch-sensitive display 110. The system 100 can correspond to a computer system, such as a desktop, laptop, tablet, or handheld computer. The system 100 can correspond to other consumer electronic devices such as mobile devices, e.g., cellular phones and PDAs, video game systems, or other electronic devices configured with a display.

The touch-sensitive display 110 can include a graphical display such as, but not limited to, a liquid crystal display (LCD). The touch-sensitive display 110 is configured to display a GUI that provides an interface, for example, a touchscreen interface, between a user of the electronic device and the operation system or application running on the electronic device. The GUI presents textual/or and graphical images to the graphical display, referred to as GUI elements. Examples of such elements can include icons, dialog boxes, menus, buttons, cursors, scroll bars, and the like. The elements can be arranged in predefined layouts on the touch-sensitive display 110, for example, to form a virtual keyboard.

A user can provide input to an application executing on the electronic device by activating the appropriate element, for example, by touching the touch-sensitive display 110 with a finger or with an object such as a stylus or pointer control device.

The touch-sensitive display 110 can generate a touch signal 101 when a touch is detected. The touch signal 101 includes information from sensors on the touch-sensitive display 110 about regions in the display corresponding to GUI images, or elements, that were detected as being touched. For example, when a virtual keyboard is presented on the display, the touch signal 101 includes information that a character key of the virtual keyboard was touched.

The system 100 includes an error detection module 102, a rules engine module 104, a user interface adjustment module 106, and a data repository 108.

The error detection module 102 can be configured with one or more parameters that define one or more error conditions, and determines if received user input data includes an error by comparing the received user input data to the error conditions.

An error condition can be defined by the error detection module to be a set of sequential user inputs. For example, an error condition can be defined as a user touching a virtual keyboard key followed by a backspace key, or highlighting a letter with a cursor followed by touching a space key on a virtual keyboard, in order to delete the letter from the application. Another example of an error condition is a user touching an icon displayed on the touch-sensitive display 110, then touching a delete button displayed on the touch-sensitive display 110 to unselect the icon.

The error detection module 102 can identify specific virtual keyboard keys, buttons, or other user interface elements, as prerequisite elements in defining error conditions, For example, a backspace key, a delete key, or a right arrow button are well-known for correcting typographical errors, and can therefore be identified as prerequisite elements. These elements can be defined as part of an error condition only if part of a sequence of user inputs. For example, when a backspace is entered following a series of space key entries, the error detection module 102 can determine that this series of user inputs do not correspond to a error condition. Instead, the backspace key is used for an ordinary purpose; in particular, the backspace key is entered to reduce the number of spaces between words.

The information provided in the touch signal 101 can indicate a region of the touch-sensitive display 110 where the touch signal 101 was generated. A region where an error occurred can be identified so that corresponding actions can be directed to the region, or neighboring regions, for example, enlarging virtual keyboard characters surrounding an erroneously touched keyboard character for easier user viewing.

The error detection module 102 can determine an error condition by measuring a time delay between user inputs, and comparing the time delay with a threshold time delay. For example, the error detection module 102 can be configured for a threshold time delay of 1 second. A time delay is measured from a start time when a virtual keyboard character is selected to an end time when a virtual backspace key is selected. If the time delay is less than 1 second, the sequence of inputs is determined by the error detection module 102 to be a user input error. Similarly, if a first icon is activated on the touch-sensitive display 110 and a second icon neighboring the first icon is activated within the next second, then the sequence of inputs is determined by the error detection module 102 to be a user input error.

The rules engine module 104 receives information related to the user input error from the error detection module 102 and compares the user input error to a predefined rule to establish an appropriate action to be performed in response to the user input error. The rule can be specified by an application developer. For example, the application developer can define a rule that establishes that a hyperlink erroneously entered into an application window is enlarged upon detection of the error.

The rules engine module 104 can modify a rule in response to statistical data collected regarding the relationships or associations between previously identified user input errors and subsequent user inputs to correct the errors. The statistical data are compared to metrics such as a threshold value to determine whether the rule is to be modified to establish a different action than a current action.

For example, a current rule establishes that a character "R" displayed on a virtual keyboard in the touch-sensitive display 110 is to be enlarged following an erroneously entered character "T" followed by a backspace key likewise displayed on the touch-sensitive display 110. However, the error detection module 102 determines that 90% of user inputs following a sequence of the character "T" and the backspace key result in an entry of a character "E", not a character "R." The rules engine module 104 can modify the rule in response to this data to establish that the character "E" is to be enlarged instead of the character "R" following an erroneously entered character "T" followed by a backspace key.

User input error information, for example, the abovementioned association data, can be stored in the data repository 108 and retrieved by the system 100 for validating user input modifications based on repetitive user input errors. Examples of a data repository 108 include, but are not limited to, hard disks, optical disks such as CD ROMs, magnetic diskettes, and flash memory.

As described above, error statistics can be determined from the user input error information. For example, statistics on the frequency of occurrence of a particular user input error can be determined from the stored user input error information. Generating and storing these statistics permits an application developer to validate whether modifications made to the touchscreen interface are beneficial to the user, supported by the user's proper correction made after the error occurs. Accordingly, an application can automatically generate favorable touchscreen interface layouts to minimize user input errors. This can be achieved by the system 100 updating a database when such events occur, and modifying a touchscreen interface layout based on user behavior over time. For example, a keyboard can be modified based on certain statistics to automatically enlarge virtual keyboard characters surrounding an erroneously activated input character when a backspace key is activated.

In an embodiment, the dimensions of a virtual keyboard are modified in response to the collected error statistics. For example, error statistics can establish that in 90% of cases where a user touched an icon in an application entitled "News" followed by touching a backspace key, the user subsequently touched an icon in the application entitled "Shopping." In view of this, the system 100 can generate a command 107 to enlarge the icon entitled "Shopping" when a cursor is positioned in a region proximal to the News and/or Shopping icons, or when a backspace key is entered following entry of the "News" icon.

The rules engine module 104 can be used by application developers to provide constraints with respect to actions performed in response to detected user input errors. A rule can include a constraint that establishes limits to the actions taken. This constraint can be applied even if captured statistics determine that the keyboard should continue to be enlarged. For example, a constraint can be to establish that a virtual keyboard is enlarged in response to a detected user input error, but does not exceed the dimensions of the touchscreen. In this manner, peripheral character keys of the virtual keyboard, for example, a shift key, remain on display despite enlarging the keyboard.

In another example, individual keys on a virtual keyboard can be enlarged, wherein the application can determine which keys are commonly used in sequencing with each other, and then enlarge keys that are likely to be next in the sequence of key presses and are common victims of user input error.

The user interface adjustment module 106 directs an action to an element displayed on the touch-sensitive display 110 in response to the rule established by the rules engine module 104. The user interface adjustment module 106 can generate a command 107 to perform the action. For example, a command 107 can be generated to enlarge a virtual keyboard character neighboring a character that was erroneously input, which can increase the likelihood that the user will select the correct character when replacing the erroneously input character. In other embodiments, the size of an icon, scroll bar, or other virtual response elements such as a handwriting recognition input area can be increased.

An application developer can use the system 100 as an application development tool, for example, to design an application under development to include display elements to be responsive to the command 107. For example, an application developer can identify features of an application layout displayed on a touch-sensitive display 110 that may reduce input error rates when the systems and methods are employed, and configure the application to respond to the command 107 to modify display regions of the application to enhance the intuitiveness of the application, or reduce complexity associated with use of the application.

The user interface adjustment module 106 can adjust the layout of the touch-sensitive display 110 in response to one or more user input errors, and in accordance with one or more rules provided by the rules engine module 104.

The user interface adjustment module 106 can modify one or more elements on the touch-sensitive display 110 for a predetermined period of time. For example, a keyboard character in a first configuration state can be increased to a second configuration state in response to a user input error for a predetermined period of time in response to a user input error. The keyboard character can return to its original first configuration state after the predetermined period of time. Optionally, the keyboard character can return to its original first configuration state after a user input is provided that rectifies the error.

The system 100 can identify commonly used sequential input patterns, for example, from information received from user input data and stored in the data repository 108. The rules engine 104 can create rules from the sequential input patterns. For example, a common sequential input pattern is the letter combination "QU." The system 100 can automatically enlarge the character "U" in a virtual keyboard after entering a character "Q" followed by an erroneous character, for example, character "T," or a combination of the character "T" followed by the backspace key.

FIG. 2 is a flowchart of an embodiment of a method 200 for modifying an element displayed on a touch-sensitive device. Some or all of the method 200 can be performed on the system 100 and/or the touch-sensitive display 110 described with reference to FIG. 1.

The method 200 commences with the user entering an input. The user input can be entered by the user to an electronic device in communication with the touch-sensitive display 110, for example, an electronic device such as a computer in communication with the touch-sensitive display 110. The user input can be entered by touching one or more elements displayed on the touch-sensitive display 110.

A user input error is detected (step 202) from the user input. A user input error can be determined from a comparison of the user input and a set of predefined error conditions, which define one or more user input errors.

A rule is applied (step 204) to the user input error (step 204). The rule can be specified by an application developer or other user. The rule specifies an appropriate action that corresponds to the user input error.

An element of the user interface is modified (step 206) in response to the rule. The element can be modified in real-time, in response to the detection of the user input error. The element can be temporarily modified after the user input is detected, until the error is corrected, for example, after a user input is provided that replaces or corrects the erroneous user input.

FIG. 3 is a flowchart of another embodiment of a method 300 for modifying an element displayed on a touch-sensitive device. Some or all of the method 300 can be performed on the system 100 and/or the touch-sensitive display 110 described with reference to FIG. 1.

Elements of an application are identified (step 302) for modification in response to a detected user error. The application can be an application under development, for example, by an application developer. The elements of the application are visually displayed on the touch-sensitive display 110, and can be activated by touch, for example, from a finger or a stylus. The elements of the application are identified as providing a user of the application with a reduced likelihood of producing user input errors during use of the application. The application is partitioned into regions of the touch-sensitive display 110, whereby each region includes one or more elements of the application. For example, one region of the touch-sensitive display 110 can display a plurality of elements as a virtual keyboard, and another region of the touch-sensitive display 110 can display the output presented in response to user input generated by touching keys on the virtual keyboard.

A rule is created (step 304) that determines modifications to be performed on the elements based on an error condition. The rule can be specified by the application developer or other user. The error condition defines an error based on one or more sequential user inputs, for example, a virtual keyboard character key is pressed immediately followed by a backspace key that is pressed. A rule is specified for each element identified for modification in the application.

A user input is compared (step 306) to a predefined error condition. In the previous example, a user input is compared to an error condition defined as a virtual keyboard character key is pressed immediately followed by a backspace key that is pressed. If there is a match (step 308), then the user input is determined to be a user input error, and rule is selected (step 310) to be applied to the user input error. The element is modified (step 312) in accordance with the action identified in the rule.

Figure 4A:
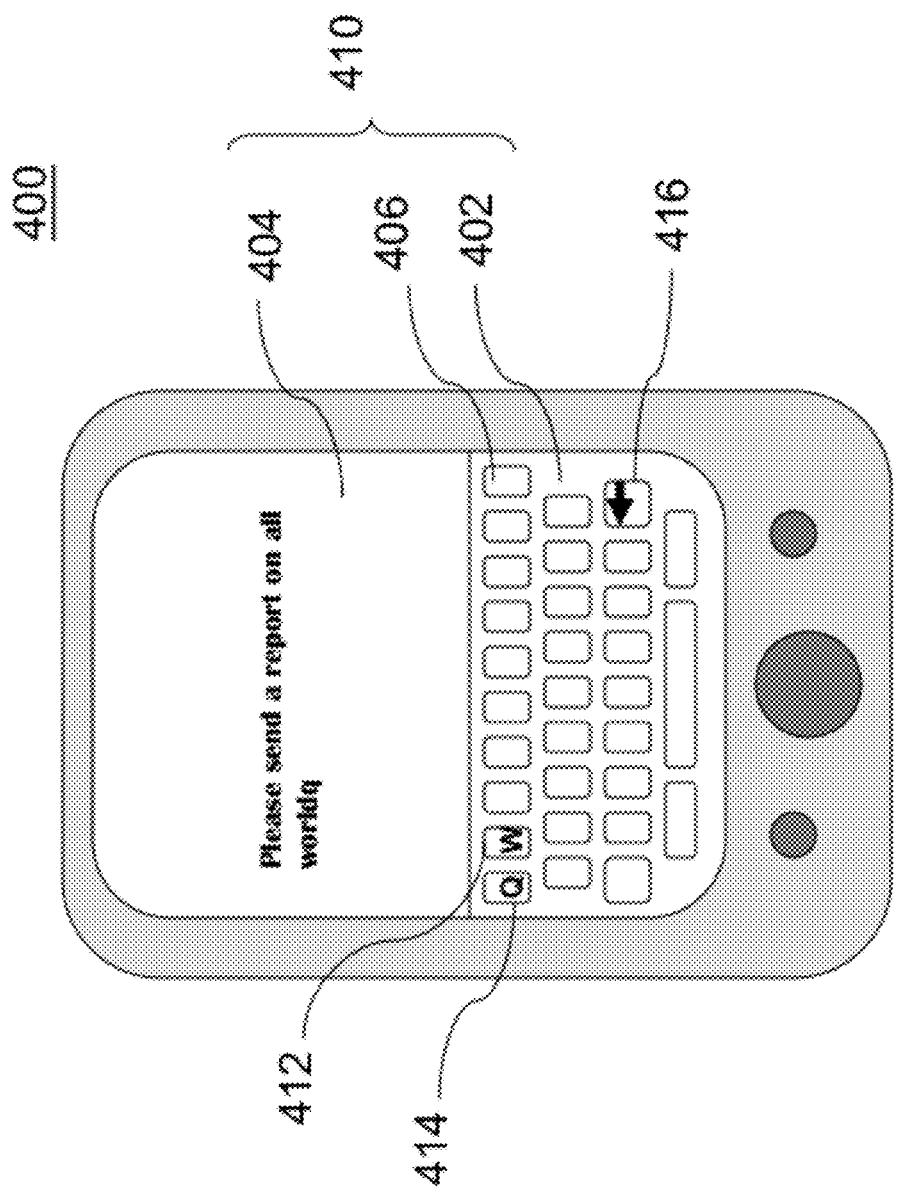
FIG. 4A is an illustration of a portable device in which embodiments of the systems and methods can be practiced.
Figure 4B:
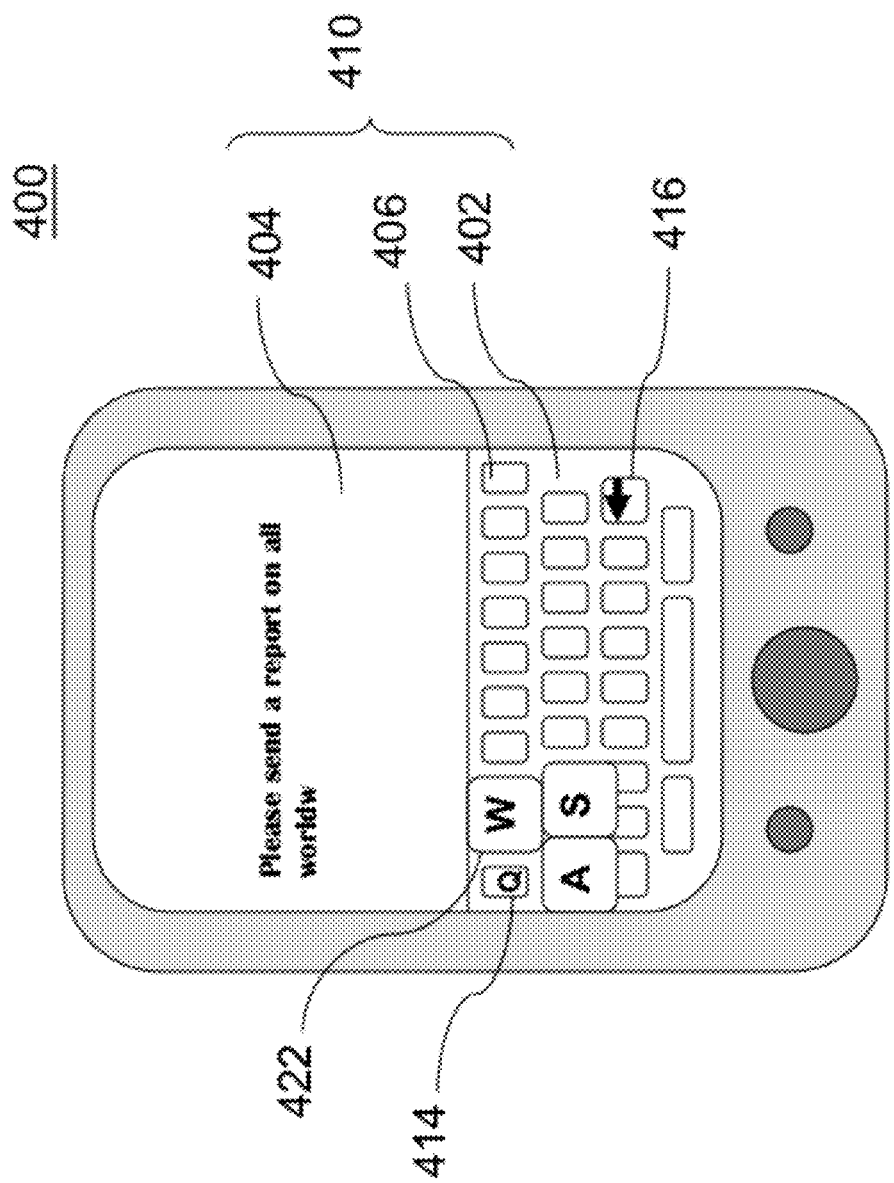
FIG. 4B is an illustration of the portable device of FIG. 4A showing a user interface modification resulting from a user input error.

FIG. 4A is an illustration of a portable device 400 in which embodiments of the systems and methods can be practiced. FIG. 4B is an illustration of the portable device 400 of FIG. 4A showing a modification. The portable device 400 can be a mobile device, such as a cellular phone or PDA, a tablet computer, or a video game system, or other electronic device configured with a display. The portable device 400 can be configured to include some or all of the system 100 described with reference to FIG. 1. Some or all of method 200 described above with reference to FIG. 2 can be performed on the portable device 400. Some or all of method 300 described above with reference to FIG. 3 can be performed on the portable device 400.

The portable device 400 includes a touch-sensitive interface 410, for example, a touchscreen. The touch-sensitive interface 410 can include a graphical display such as, but not limited to, a liquid crystal display (LCD). The touch-sensitive interface 410 detects the presence and location of a touch, for example, from a person's finger or an object such as a stylus or pointer control device.

The touchscreen interface 410 includes a first display region 402 and a second display region 404. At least one of the first and second display regions 402, 404 can present text, graphics, video, or other forms of display data. In an embodiment, the first display region 402 displays a virtual keyboard 406. The layout of the virtual keyboard 406 can be a well-known layout, for example, in a "QWERTY" format. In other embodiments, the first display region 402 can display icons, menus, uniform resource locator (URL) fields, and the like.

During operation, a user can accidentally type the letter "Q" 414 instead of "W" 412 on the virtual keyboard 406. If this event occurs, then this error is detected by establishing that when the letter "Q" 414 was typed, it was immediately followed by a backspace key 416. In accordance with an embodiment, after the user touches the backspace key 416, the letters A and W are enlarged around the letter Q, thereby increasing the surface area of the touchscreen 410 for the user to replace the letter Q with the correct letter, for example, the letter W.

Figure 5A:
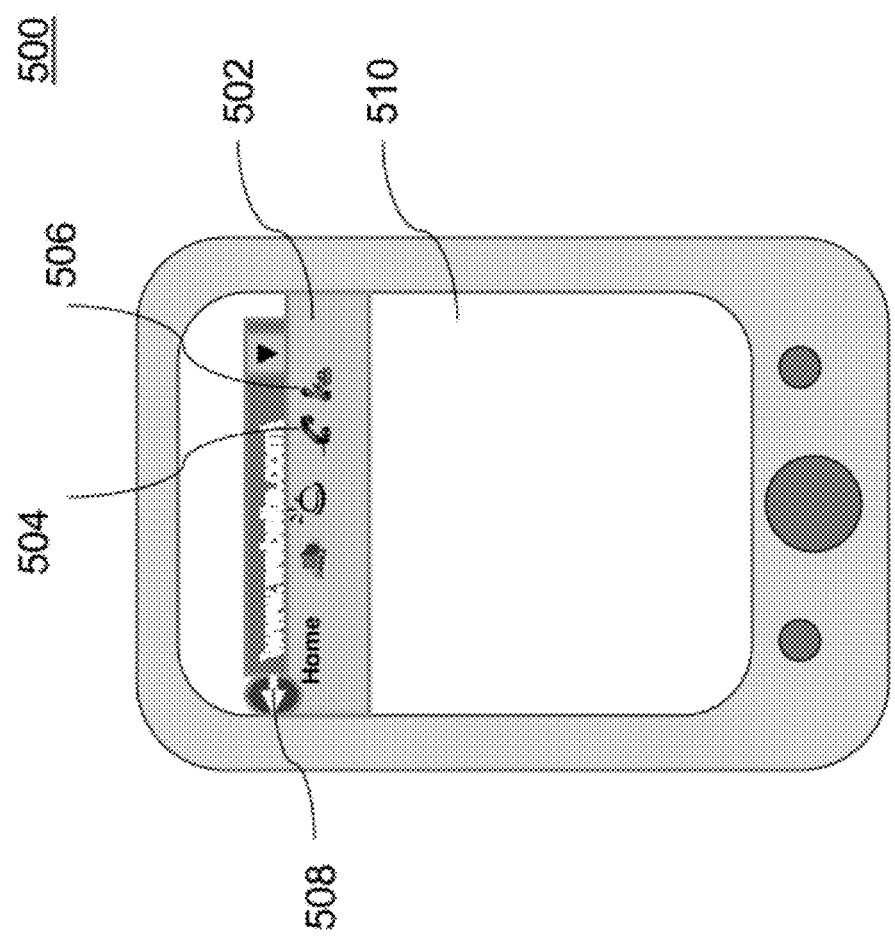
FIG. 5A is an illustration of a portable device in which embodiments of the systems and methods can be practiced.
Figure 5B:
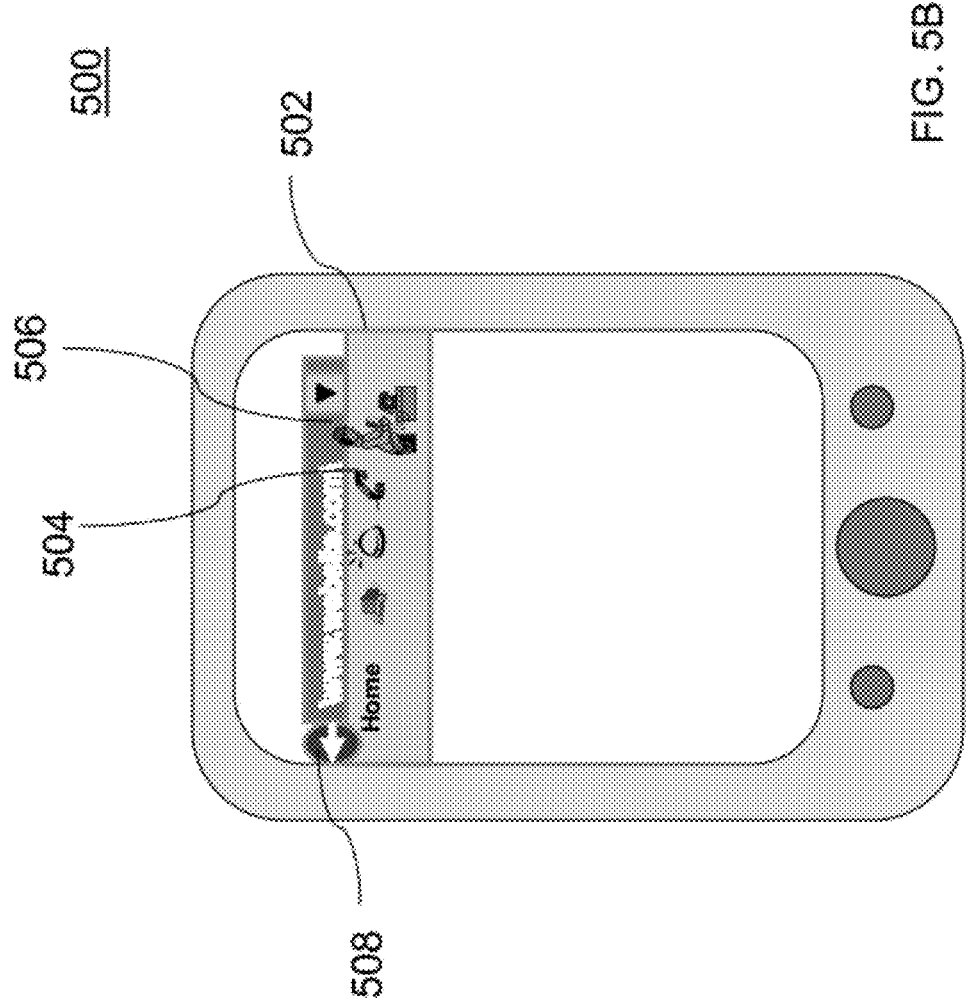
FIG. 5B is an illustration of the portable device of FIG. 5A showing a user interface modification resulting from a user input error.

FIG. 5A is a diagram of a portable device 500 in which embodiments of the systems and methods can be applied. FIG. 5B is a diagram of the portable device 500 of FIG. 5A illustrating a user interface modification. The portable device 500 can be the same portable device or a similar device as the portable device 400 described in FIGS. 4A and 4B. Accordingly, the portable device 500 can be configured to include some or all of the system 100 described with reference to FIG. 1, and to practice one or both of the methods 200 and 300 described above with reference to FIGS. 2 and 3.

The portable device 500 includes a touchscreen interface 510. A menu bar 502 of an application is displayed on the touchscreen interface 510. The menu bar 502 includes several buttons, each of which can execute one or more programs of the application in the portable device 500 when activated by a touch. Two such buttons are a first button 504 and a second button 506.

During operation, a user can accidentally activate the first button 504 instead the second button 506 on the virtual keyboard. This error can be detected by establishing that when the first button 504 was pressed, it was immediately followed by a left arrow or back button 508. In accordance with an embodiment, after the user touches the back button 508, also referred to as the left arrow button, the neighboring second button 506 is enlarged, whereby the user can correct the error by touching the second button 506.

While the invention has been shown and described with reference to specific embodiments, it should be understood by those skilled in the art that various changes in form and detail may be made therein without departing from the spirit and scope of the invention.

What is claimed is:

1. A computer-implemented method for modifying a display on a touch-sensitive device, the method comprising:
   receiving a user input of a first element on a graphical user interface (GUI) of the touch-sensitive device, wherein elements of the GUI are keyboard characters of a virtual keyboard;
   determining and enlarging a next element on the virtual keyboard, in response to information stored in a database that a current element and the next element are commonly in sequence and the next element is frequently a victim of user input error;
   detecting a user input error based on user input of a second element immediately following the first element, wherein the second element is associated with correcting the first element;
   performing one of a plurality of actions in response to each user input error, said plurality of actions comprising at least a first action and a second action different from the first action, wherein said plurality of actions further comprise modifying an element of the GUI to which the action is directed;
   identifying a first rule that determines the first action to be directed to a third element on the GUI in response to each user input error based on the user input of the second element immediately following the first element;
   determining if the first action directed to the third element is an incorrect action by comparing the first action to a set of data stored in the database indicating that the first action is incorrect;
   changing the first rule to a second rule that determines the second action to be directed to a fourth element on the GUI when determining that the first action is incorrect based on the comparison with the stored set of data indicating that a high percentage of inputs includes an input of the fourth element different than the third element; and
   performing the second action on the fourth element instead of the third element of the GUI in response to the second rule.

2. The computer-implemented method of claim 1, wherein detecting the user input error comprises comparing the user input and a predefined error condition.

3. The computer-implemented method of claim 1, wherein detecting the user input error comprises:
   measuring a time delay between user inputs to the touch-sensitive device; and
   comparing the time delay and a threshold time delay.

4. The computer-implemented method of claim 1 further comprising:
   determining a plurality of user input errors;
   generating a metric from the received plurality of user input errors; and
   changing the first rule in response to the metric if the metric indicates that a user input correction is not to be performed after the user input error is detected.

5. The computer-implemented method of claim 1 wherein the touch sensitive device comprises one of a mobile device, a cell phone, a tablet computer, a personal digital assistance, a video game system or an electronic device having a visual display.

6. The computer-implemented method of claim 1, wherein the second action comprises enlarging each virtual keyboard character immediately surrounding and proximate to the first element touched in error on the GUI.

7. The computer-implemented method of claim 1, wherein the GUI is a virtual keyboard.

8. The computer-implemented method of claim 1, wherein the touch-sensitive device receiving the user input comprises detecting of a touch from a finger or a pointed object.

9. A computer-implemented method for modifying an element of an application displayed on a touch-sensitive device, the method comprising:
   receiving a user input of a first element on a graphical user interface (GUI) of the touch-sensitive device, wherein elements of the GUI are keyboard characters of a virtual keyboard;
   determining and enlarging a next element on the virtual keyboard, in response to information stored in a database that a current element and the next element are commonly in sequence and the next element is frequently a victim of user input error;
   detecting a user input error based on user input of a second element immediately following the first element, wherein the second element is associated with correcting the first element;
   performing one of a plurality of actions in response to each user input error, said plurality of actions comprising at least a first action and a second action different from the first action, wherein said plurality of actions further comprise modifying an element of the GUI to which the action is directed;
   identifying a first rule that determines the first action to be directed to a third element on the touch-sensitive device in response to each user input error based on the user input of the second element immediately following the first element;
   determining that the first action directed to the third element is an incorrect action by comparing the first action to a set of data stored in a database indicating that the first action is directed to a fourth element different than the third element;
   changing the first rule to a second rule that determines the second action to be directed to the GUI in response to the determination that the first action is an incorrect action based on the comparison with the stored set of data indicating that a high percentage of inputs includes an input of the fourth element different than the third element, wherein the second rule is different from the first rule; and
   performing the second action on the fourth element instead of the third element of the GUI in response to the second rule.

10. The computer-implemented method of claim 9, wherein detecting the user input error comprises comparing the user input and a predefined error condition.

11. The computer-implemented method of claim 9, wherein detecting the user input error comprises:
   measuring a time delay between user inputs to the application; and
   comparing the time delay and a threshold time delay.

12. The computer-implemented method of claim 9 further comprising:
   determining a plurality of user input errors to the application;
   generating a metric from the received plurality of user input errors; and
   changing the first rule in response to the metric if the metric indicates that a user input correction is not to be performed after the user input error is detected.

13. The computer-implemented method of claim 9 wherein the touch sensitive device comprises one of a mobile device, a cell phone, a tablet computer, a personal digital assistance, a video game system or an electronic device having a visual display.

14. The computer-implemented method of claim 9, wherein the second action comprises enlarging each virtual keyboard character immediately surrounding and proximate to the first element touched in error on the GUI.

15. The computer-implemented method of claim 9, wherein the GUI is a virtual keyboard.

16. The computer-implemented method of claim 9, wherein the touch sensitive device receiving the user input comprises detecting of a touch from a finger or a pointed object.

17. A system that modifies a display of a touch-sensitive device, the system comprising:
   an error detection processor,
      receiving a user input of elements, being keyboard characters of a virtual keyboard, on a graphical user interface (GUI) of the touch sensitive device,
      determining and enlarging a next element on the virtual keyboard, in response to information stored in a database that a current element and the next element are commonly in sequence and the next element is frequently a victim of user input error,
      detecting a user input error when a first element is immediately followed by a second element, wherein the second element is associated with correcting the first element, and
      performing one of a plurality of actions in response to each user input error, said plurality of actions comprising at least a first action and a second action different from the first action, wherein the plurality of actions further comprise modifying an element of the GUI to which the action is directed;
   a rules engine-processor that identifies a first rule that determines the first action to be applied to a third element in response to each user input error based on the user input of the second element immediately following the first element;
   the system further determining that the first action is an incorrect action by comparing the first action to set of data stored in the database indicating that the first action is directed to a fourth element different than the third element, and changing the first rule to a second rule that determines the second action to be directed to the GUI in response to the determination that the first action is an incorrect action based on the comparison with the stored set of data indicating that a high percentage of inputs includes an input of the fourth element different than the third element, wherein the first and second rules are different; and
   the system further comprising a user interface adjustment processor that performs a second action on the fourth element instead of the third element in response to the second rule.

18. The system of claim 17, wherein the error detection module is configured to compare the user input and a predefined error condition to detect the user input error.

19. The system of claim 17, wherein the error detection module comprises:
   a timer that measures a time delay between user inputs to the touch-sensitive device; and
   a comparator that compares the time delay and a threshold time delay.

20. The system of claim 17 further comprising a data repository, wherein a plurality of user input errors are stored in the data repository, and wherein the rules engine module generates a metric from the received plurality of user input errors and changes the first rule in response to the metric if the metric indicates that a user input correction is not to be performed after the user input error is detected.

21. The system of claim 17 further comprising a data repository for storing data regarding the elements and rules.

22. The system of claim 17, wherein the second action comprises enlarging each virtual keyboard character immediately surrounding and proximate to the first element touched in error on the GUI.

23. The system of claim 17, wherein the GUI is a virtual keyboard.

24. The system of claim 17, wherein the touch-sensitive interface element receives the user input error by detecting a touch from a finger or a pointed object.

25. A computer program product for modifying an element displayed on a touch-sensitive device, the computer program product comprising:
   a non-transitory computer readable storage medium having computer readable program code embodied therewith, the computer readable program code comprising:
      computer readable program code configured to receive a user input associated with a first element on a graphical user interface (GUI) of the touch-sensitive device, wherein elements of the GUI are keyboard characters of a virtual keyboard;
      determining and enlarging a next element on the virtual keyboard, in response to information stored in a database that a current element and the next element are commonly in sequence and the next element is frequently a victim of user input error;
      computer readable program code configured to detect a user input error based on the user input of a second element immediately following the first element, wherein the second element is associated with correcting each user input error associated with the first element and the second element;
      computer readable program code configured to perform one of a plurality of actions in response to each user input error, said plurality of actions comprising at least a first action and a second action different from the first action, wherein the plurality of actions further comprise modifying an element of the GUI to which the action is directed;
      computer readable program code configured to identify a first rule that determines the first action to be directed to a third element on the touch-sensitive device in response to each user input error based on the user input of the second element immediately following the first element;
      computer readable program code configured to determine that the first action directed to the third element is an incorrect action by comparing the first action to a set of data stored in a database indicating that each user input error is corrected by the second action directed to a fourth element different than the third element following the first element and the second element;
      computer readable program code configured to change the first rule to a second rule in response to the determination that the first action is an incorrect action based on the comparison with the stored set of data indicating that a high percentage of inputs includes an input of the fourth element different than the third element; and computer readable program code configured to perform the second action on the fourth element instead of the third element of the GUI in response to the second rule.

\* \* \* \* \*